Nov. 1, 1932. F. DEUTSCH 1,885,188
ARBOR FOR RING SPLITTING MACHINES
Filed May 4, 1931 2 Sheets-Sheet 1
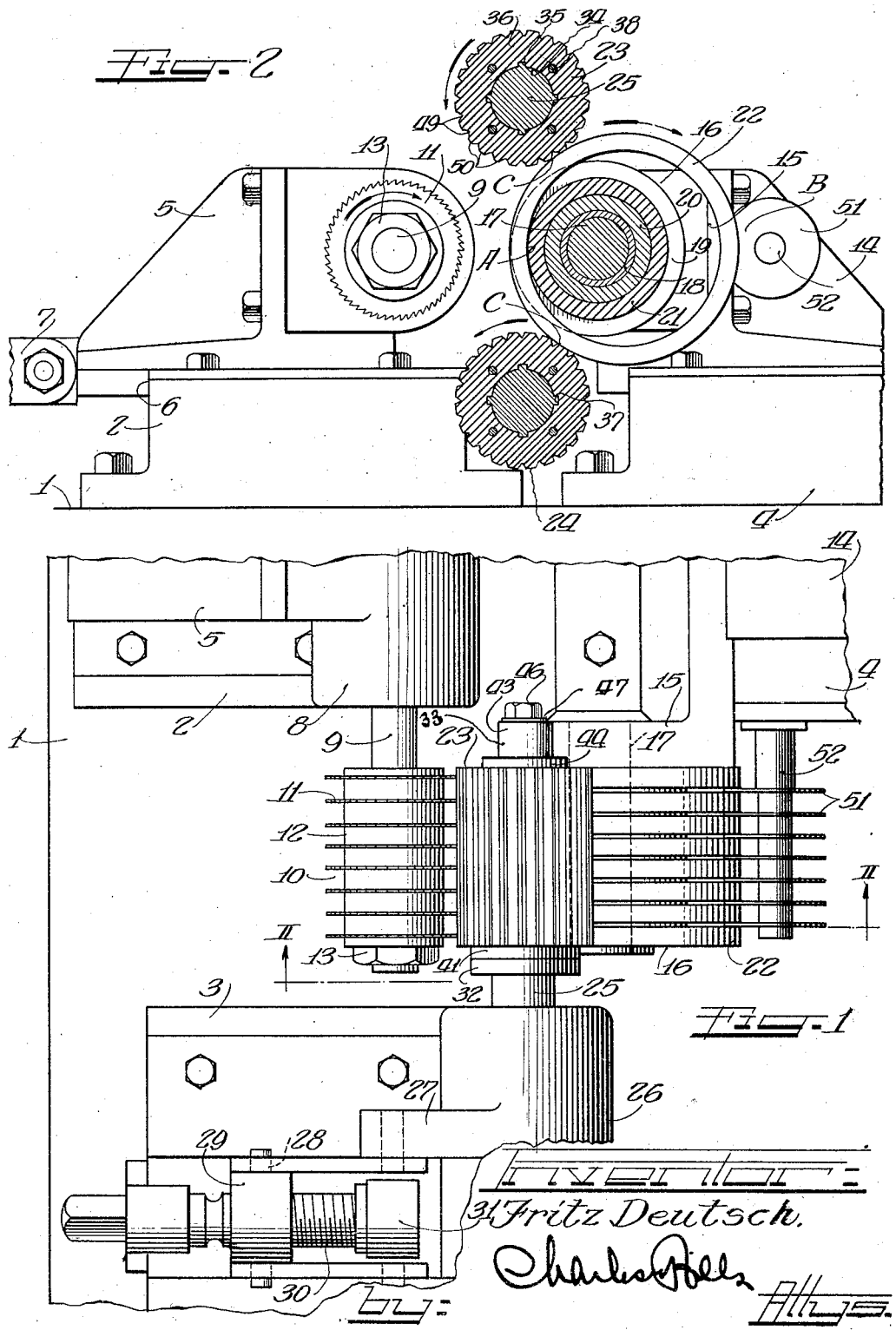

Nov. 1, 1932.   F. DEUTSCH   1,885,188
ARBOR FOR RING SPLITTING MACHINES
Filed May 4, 1931   2 Sheets-Sheet 2
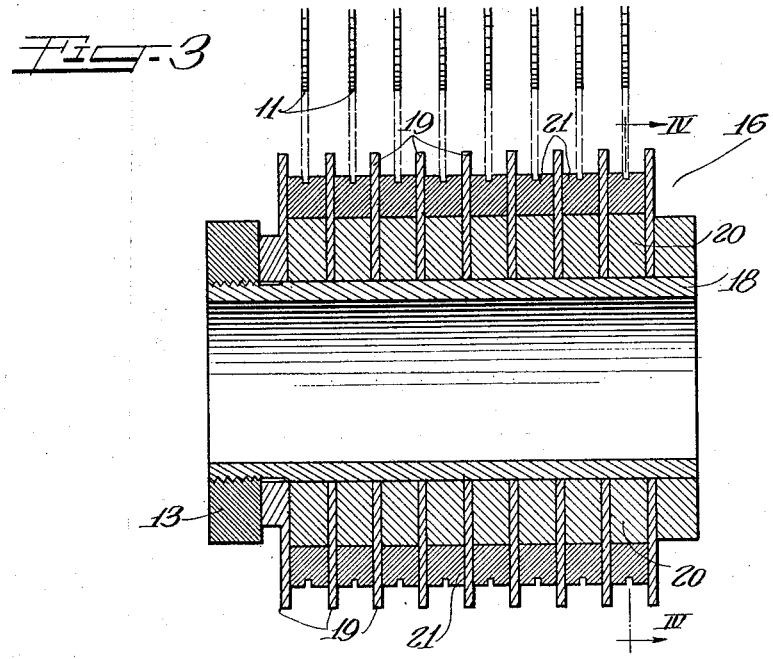
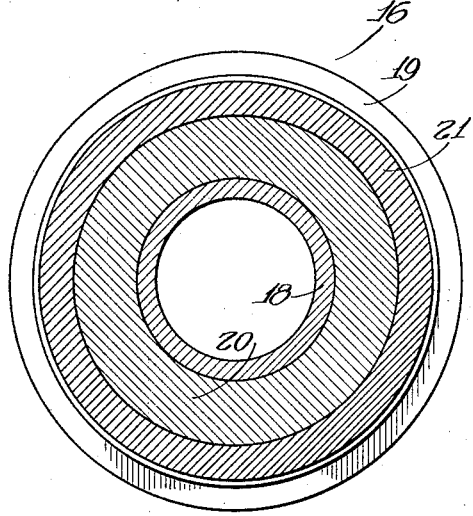
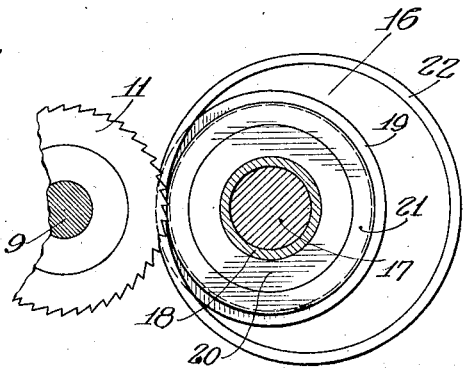
Inventor:
Fritz Deutsch
by Charles Hill Attys Patented Nov. 1, 1932

1,885,188

UNITED STATES PATENT OFFICE

FRITZ DEUTSCH, OF MEMPHIS, TENNESSEE, ASSIGNOR, BY MESNE ASSIGNMENTS, TO SPARTA FOUNDRY COMPANY, OF SPARTA, MICHIGAN, A CORPORATION OF MICHIGAN

ARBOR FOR RING SPLITTING MACHINES

Application filed May 4, 1931. Serial No. 534,833.

This invention relates to an arbor for a ring splitting machine or other type of machine for processing annularly shaped articles, such as piston rings or piston ring castings.

In my copending application, Serial No. 346,227, filed March 11, 1929, I have described and claimed a machine for splitting piston rings. The present invention relates to a novel construction for the arbor shown in that application for rotatably supporting the rings to be split.

In the manufacture of piston rings, it is common practice to form a piston ring casting that is out-of-round, in order that when the so called "gap piece" is removed, the piston ring made from the casting is free to assume under compression a circular form. Because, however, of its out-of-round form, but more particularly because of the great multitude of different diameters of piston rings, it is impractical to support the piston ring castings or semi-finished piston rings for any processing operation such as splitting or grinding, upon any usual type of mandrel or chuck. As described in my copending application, I have now devised a machine for splitting semifinished piston rings that includes an arbor of lesser diameter than the piston rings to be split for loosely supporting a plurality of piston rings in spaced relation. While so supported, the piston rings are rotated by means of a pair of resilient covered drive rolls through surface contact with the outer peripheries of the rings. Such a device is of great practical utility for the reason that it can be used in the processing of a number of annular members simultaneously, regardless of whether they are truly circular in form or slightly out-of-round, and furthermore, the device is capable without modification of use in the processing of rings of different diameter. The device is particularly adapted for the splitting of semi-finished piston rings, as obtained from double castings by rough grinding the inner and outer peripheral surfaces and lateral surfaces of the rough castings. For instance, the difficulties attendant upon casting a one-eighth inch piston ring can be largely avoided by forming a casting, referred to as a double casting, of slightly greater width than one-quarter inch to allow for machining and then, after the rough grinding operation referred to, splitting the semi-finished ring to form two one-eighth inch width piston rings. This size of piston ring is now by far the most popular width in use in automotive vehicles.

In view of the unevennesses in the surfaces of a rough casting or even in a semi-finished piston ring, I have found it advantageous in the construction of the arbor for supporting the piston rings to provide a cushioning surface for contact with the inner peripheral surface of the casting or semi-finished rings. The resilient surfaces so provided have distinct advantages over the use of rigid metallic surfaces, since they permit rough places on the inner periphery of the rings to embed themselves in the resilient surfaces and thus prevent the rings from wabbling and insure a more accurate and truer sawing of the rings. Furthermore, the resilient surfaces prevent slippage and eliminate danger to the saws as they provide a soft material into which the saw teeth may cut after cutting through the rings.

It is therefore an important object of this invention to provide an arbor of novel and improved construction especially adapted for use in a machine for processing annular articles, such as piston rings and the like.

Other and further important objects of this invention will be apparent from the disclosures in the specification and the accompanying drawings.

This invention (in a preferred form) is illustrated in the drawings and hereinafter more fully described.

On the drawings:

Figure 1 is a fragmentary top plan view of a machine for splitting semi-finished piston rings, embodying the principles of this invention.

Figure 2 is a sectional view taken substantially on the broken line II—II of Figure 1.

Figure 3 is an enlarged longitudinal sectional view of an arbor, illustrating movement of the saw.

Figure 4 is a sectional view taken substantially on the line IV—IV of Figure 3.

Figure 5 is a detail view, partly in section.

As shown on the drawings:

The reference numeral 1 indicates a supporting frame to which are suitably secured a plurality of bed plates 2, 3 and 4. A bracket 5 is slidably mounted upon the bed plate 2 in guideways 6, in which the bracket 5 is adapted to be reciprocated by suitable reciprocating mechanism (not shown) connected to the end of the bracket by means of a linkage 7. Said bracket 5 is provided with a bearing 8 in which is mounted a transversely extending shaft 9 carrying on its projecting end a gang saw 10. Said gang saw 10 comprises a plurality of spaced disk saws 11 separated by metallic spacing collars 12, the disk saws and collars being tightly assembled by means of a nut 13 threaded on the free end of the shaft 9. The gang saw 10 is adapted to be rotated at a suitable rate of speed from a source of power not shown.

Another bracket 14 is slidably mounted in the bed plate 4 in juxtaposition to the bracket 5. Suitable mechanism (not shown) is provided for moving the bracket 14 in the bed plate 4 toward and away from the bracket 5. Said bracket 14 includes an angle piece 15 that supports an arbor 16 by means of a pin 17 extending through said angle piece 15. Said arbor 16 is rotatably mounted upon the extended portion of the pin 17 and comprises a bearing sleeve 18 on which are assembled a plurality of spacing washers 19, spacing collars 20 and resilient spacing washers 21. The metal spacing collars 20 are mounted directly upon the bearing sleeve 18 and the resilient spacing washers 21, which are of the same width as the spacing collars 20, are slipped over said collars 20. The spacing washers 19, which are separated by the collars 20 and spacing washers 21, are of greater diameter than the outside diameter of the spacing washers 21 to provide annular channels of very slightly greater width than the width of the piston rings 22 that are to be split.

As shown in Figure 2, the piston rings 22 are mounted upon the arbor 16 in the annular grooves provided by the spacing washers 19. The outside diameter of the spacing washers 21 is intentionally substantially less than the diameter of the smallest piston ring that the machine is designed to split. Consequently, the piston rings 22, when mounted upon the arbor 16, are loosely supported thereby.

A pair of drive rolls 23 and 24 are utilized for rotating the piston rings 22 upon the arbor 16 during the splitting operation. Said drive rolls 23 and 24 are mounted upon driven shafts 25 journaled in bearings 26 (only one shown). Said bearings 26 are connected by means of yokes 27 and pins 28 to a head 29 of an adjusting screw 30. Said adjusting screw 30 is threaded through a stationary boss 31 carried by the bed plate 3. Adjustment of the screw 30 serves to bring the drive rolls 23 and 24 closer together or farther apart as desired, depending upon the diameter of the piston rings 22 being split. Each of the drive rolls 23 and 24 is driven from a common source of power at the same speed and in the same directions, as indicated by the arrows in Figure 2. Said drive rolls 23 and 24 are so positioned and spaced as to engage the outer peripheral surface of the piston rings 22 at points above and below the point of engagement of the saws 11, the points of contact of the driving rolls being about 120° apart and the saws 11 contacting at points substantially along the bisection of this angle. The drive rolls 23 and 24 thus serve to hold the piston rings 22 up against the spacing washers 21 at points directly back of the points of engagement of the saws 11.

Each of the drive rolls 23 and 24 is of the same construction, comprising a shaft 25 having an integrally formed head 32, a reduced end 33 and an intermediate cylindrical portion 34 having raised keyways 35. A shell 36 of some suitable resilient material, such as relatively soft rubber, is adapted to be mounted upon the cylindrical portion of the shaft and for this purpose is provided with internal longitudinally extending grooves 37 for receiving the raised keyways 35. Although there are four such keyways 35 shown in equally spaced relation about the cylindrical portion 34 of the shaft 25, it will be understood that fewer or more keyways may be employed. The shell 36 is further secured to the shaft 25 by means of a plurality of dowel pins 38 that are received in corresponding recesses formed in the adjacent ends of the head 32 and shell 36, respectively. A washer or collar 41 may be splined upon the cylindrical portion 34 between the adjacent ends of the head 32 and the shell 36, as shown in Figure 2, and if so, this washer is provided with aligned bores through which the dowel pins may pass. It is obvious that the head 32 need not be integrally formed with the shaft 25 but may be secured thereon, as desired. A sleeve 43 is splined on the reduced end 33 of the shaft 25 and provided with a flange 44 adapted to abut the other end of the shell 36. Dowel pins are similarly arranged in the adjacent ends of the shell 36 and flange 44. The extremity of the reduced end 33 is threaded to receive a nut 46 and washer 47. The cylindrical portion 34 is preferably slightly shorter than the length of the shell 36 in order to provide a take-up space to permit the parts of the drive roll to be assembled tightly in place by screwing home the nut 46.

The purpose of the raised keyways 35 and dowel pins 38 is to prevent relative rotative movement between the shell 36 and the shaft 25. The shell 36 is preferably of relatively soft rubber, so that if the keyways alone were relied upon to prevent relative movement between the shell and shaft, there would be the danger of the rubber giving sufficiently to ride over the raised keyways. Consequently, the dowel pins serve to eliminate this danger and also to prevent excessive torsional stresses in the body of the resilient shell 36.

The surface of the rubber shell 36 is provided with a plurality of longitudinally extending grooves 49, which are preferably V-shaped and relatively closely spaced about the circumference of the shell. Said grooves 49 provide intermediate ribs or corrugations 50 that serve to insure more positive surface engagement with the piston rings 22 during the processing operation.

I have found that if smooth-faced resilient covered driving rolls are used, there is some tendency for slippage between the surfaces of the drive roll and of the piston rings, due to the out-of-round form of the piston rings, or normal variations in the thickness of the rings or unevennesses in the surfaces thereof. In the present construction using longitudinally extending grooves, the ribs or corrugations 50 act somewhat like fingers in advancing the piston rings, so that there is a direct and positive surface drive of the rings. Furthermore, the provision of the longitudinally extending grooves 49 permits the rubber or other resilient material of the ridges 50 to flow with less obstruction when variations in pressure between the drive roll and the piston rings occur, than in the case of a smooth faced continuous surface roll.

In operation, the piston rings 22 are mounted in spaced relation upon the arbor 16 and the drive rolls 23 and 24 brought into contact therewith and set in motion to revolve the piston rings. The drive rolls 23, at the same time, resiliently hold the piston rings up against the surface of the resilient, spacing washers 21, as at A, (Figure 2). As previously pointed out, there is sufficient clearance between the side faces of the piston rings 22 and the spacing washers 19 to eliminate excessive friction. This clearance, however, makes possible a much greater amount of clearance on the other side of the piston rings, as at B, due to the resiliency of the spacing washers 21 and the full diameter distance between the points A and B. In order to prevent the piston rings 22 at the point B from wabbling from the vertical plane, a plurality of rigidly mounted washers 51 are provided mounted upon a pin 52 from the bed plate 4. Said washers 51 extend into the spaces between the piston rings 22 to keep them uniformly spaced apart and prevent the piston rings from weaving or wabbling.

It will be understood that the bracket 14 is initially in outwardly removed position to permit the piston rings 22 to be mounted on the arbor 16 and is then moved into the position shown in Figures 1 and 2 for contact with the driving rolls 23 and 24. The gang saw 10 is then moved, by movement of the bracket 5, into the position indicated in Figure 5 to split the rings 22. The saws 11 are so aligned as to engage the piston rings 22 directly opposite the point marked A representing the contact between the piston rings and the resilient spacing washers 21. Consequently, the piston rings 22 are firmly held at three points during the splitting operation, namely the point A and points C, which represent the points of contact between the drive rolls 23 and 24 and the piston rings 22. It will be understood that the gang saw 10 is automatically advanced at the proper rate of speed until the piston rings 22 are completely sawed in two. The resilient spacing washers 21 permit the saws 11 to complete the sawing operation without coming into contact with any hard material after the piston rings are completely severed.

At the end of the splitting operation, the gang saw 10 is retracted by suitable semi-automatically controlled mechanism and the bracket 14 again moved outwardly to permit the piston rings 22 to be removed.

While my invention has been particularly described in connection with a splitting machine for piston rings, it will be understood that the construction of the arbor is such as to find utility in other forms of apparatus for processing annular articles, and more particularly annular articles that are not in the form of true circles. It will also be understood that although the rings 22 have been referred to as piston rings, or semi-finished piston rings, the rough castings for piston rings can also be split in the same manner. It is preferable, however, first to rough grind the inner and outer surfaces of the piston ring castings and their lateral surfaces to eliminate the roughness and inequalities of the rough castings, since by so doing, much more accurate splitting of the rings can be accomplished to form more uniform rings after splitting.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a machine of the class described, an arbor for supporting a plurality of annular members, said arbor having spacing means for spacing said members having diameters considerably greater than the diameter of the arbor, a resilient surface intermediate said spacing means for contacting the inner peripheral surface of said annular members, drive rolls for holding said annular members against said resilient surfaces and rotating said annular members by contact with the outer peripheral surfaces thereof and a pin parallel to and adjacent said arbor, said pin having spacing means aligned with the spacing means on said arbor to prevent the wabbling of said annular members.

2. In a machine for processing annular articles, a rotatably mounted arbor having grooves with resilient bottom portions therein for receiving a plurality of annular members and loosely supporting the same therein and a pair of drive rolls having resilient surfaces for contact with the outer peripheral surfaces of said annular members to rotate the same on said arbor.

3. An arbor for loosely supporting a plurality of annular members, comprising a shaft, a tubular member rotatable thereon, a plurality of spaced discs on said tubular member, spacing collars positioned between adjacent disks, resilient rings mounted over said spacing collars and means on said tubular member holding the discs, collars and rings in assembled relation.

4. In a piston ring splitting machine, an arbor for rotatably supporting loosely thereon a plurality of rings in spaced relation, said arbor having a cylindrical resilient surface against which said rings bear, means for rotating said rings on said arbor, a gang saw relatively movable into contact to split said rings while held against said resilient surface and spacing means extending between successive rings on the side diametrically opposite the points of contact with said saw.

5. In a machine for splitting annular articles, an arbor having spacing means thereon and bands of resilient material between said spacing means, said bands being of smaller diameter than said spacing means thereby providing grooves for the reception of annular articles to be split, and resiliently covered drive rolls for rotating said annular articles upon said arbor by contact with the outer peripheral surfaces of said annular articles.

6. An arbor for loosely supporting a plurality of annular members, comprising a shaft, a tubular member rotatable thereon, a plurality of spaced discs on said tubular member, spacing collars positioned between adjacent discs, resilient rings mounted over said spacing collars, said resilient rings being provided with annular grooves in their outer peripheries, and means on said tubular member holding the discs, collars and rings in assembled relation.

In testimony whereof I have hereunto subscribed my name at Memphis, Shelby County, Tennessee.

FRITZ DEUTSCH.